United States Patent [19]
Uchiyama et al.

[11] Patent Number: 5,435,180
[45] Date of Patent: Jul. 25, 1995

[54] METHOD AND SYSTEM FOR MEASURING AIR FLOW RATE

[75] Inventors: Kaoru Uchiyama; Mitsukuni Tsutsui, both of Ibaraki; Minoru Takahashi, Mito, all of Japan

[73] Assignee: Hitachi, Ltd., Japan

[21] Appl. No.: 132,171

[22] Filed: Oct. 6, 1993

[30] Foreign Application Priority Data

| Oct. 7, 1992 | [JP] | Japan | 4-268430 |
| Dec. 25, 1992 | [JP] | Japan | 4-345983 |
| Jun. 2, 1993 | [JP] | Japan | 5-131644 |

[51] Int. Cl.$^6$ ............................... G01F 1/68
[52] U.S. Cl. ............................... 73/204.19; 73/204.18
[58] Field of Search .................. 73/118.2, 198, 204.18, 73/204.19, 861.02, 861.03; 370/11, 110.4

[56] References Cited

U.S. PATENT DOCUMENTS

| Re 31,906 | 6/1985 | Oyama et al. | 73/204.18 |
| 3,614,892 | 10/1971 | Ottenstein | 73/861.03 |
| 3,718,766 | 2/1973 | Stover | 370/11 |
| 3,800,592 | 4/1974 | Jones, Jr. | 73/204.18 X |
| 4,264,961 | 4/1981 | Nishimura et al. | 73/204.18 |
| 4,337,655 | 7/1982 | Sundstrom et al. | 73/198 X |
| 4,390,956 | 6/1983 | Cornforth et al. | 73/861.03 X |
| 4,719,616 | 1/1988 | Amano | 370/110.4 X |
| 4,739,309 | 4/1988 | Bräuninger et al. | 340/534 |
| 4,918,995 | 4/1990 | Pearman et al. | 73/861.02 |
| 5,126,998 | 6/1992 | Stem, Jr. | 370/11 |

FOREIGN PATENT DOCUMENTS

| 0261423A1 | 3/1988 | European Pat. Off. |
| 3615628A1 | 11/1287 | Germany |
| 277766A1 | 4/1990 | Germany |
| 1-100423 | 4/1989 | Japan |
| 2-85724 | 3/1990 | Japan |

OTHER PUBLICATIONS

"Einführung in die Meβtechnik," Hans Hart, 1st ED, VEB Verlog Technik, Berlin, 1977, pp. 324–330.
Communication from German Patent Office with English translation.

*Primary Examiner*—Chilcot, Jr. Richard E.
*Assistant Examiner*—Elizabeth L. Dougherty
*Attorney, Agent, or Firm*—Evenson, McKeown, Edwards & Lenahan

[57] ABSTRACT

An air flow measuring system has a unit for measuring an air flow rate and outputting an air flow rate indicative signal, a unit for measuring an air temperature for outputting an air temperature indicative signal, and a mixing unit for converting the air flow rate indicative signal and the air temperature indicative signal by superimposing them so that the converted signal may be transmitted through a single signal transmission path.

23 Claims, 19 Drawing Sheets

F I G. 14
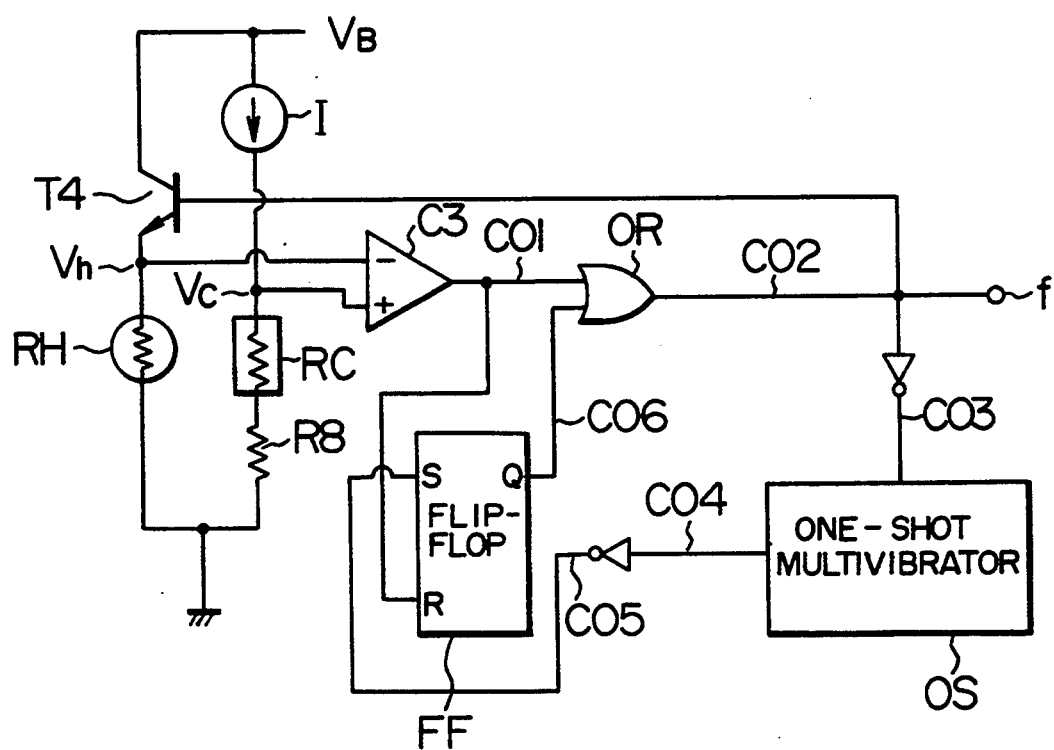

F I G. 17
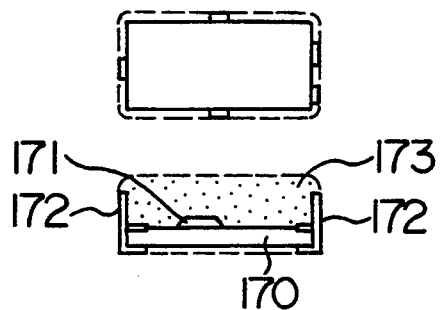
F I G. 18
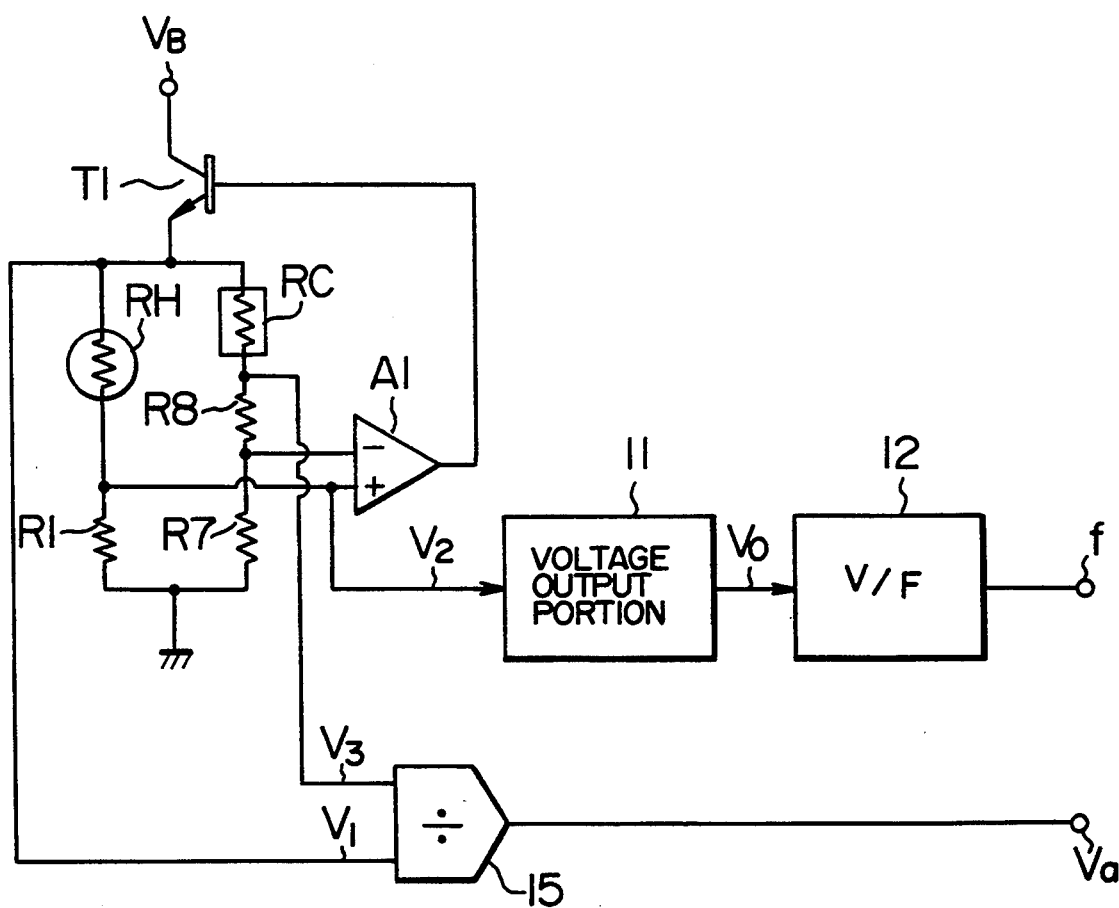

F I G. 22
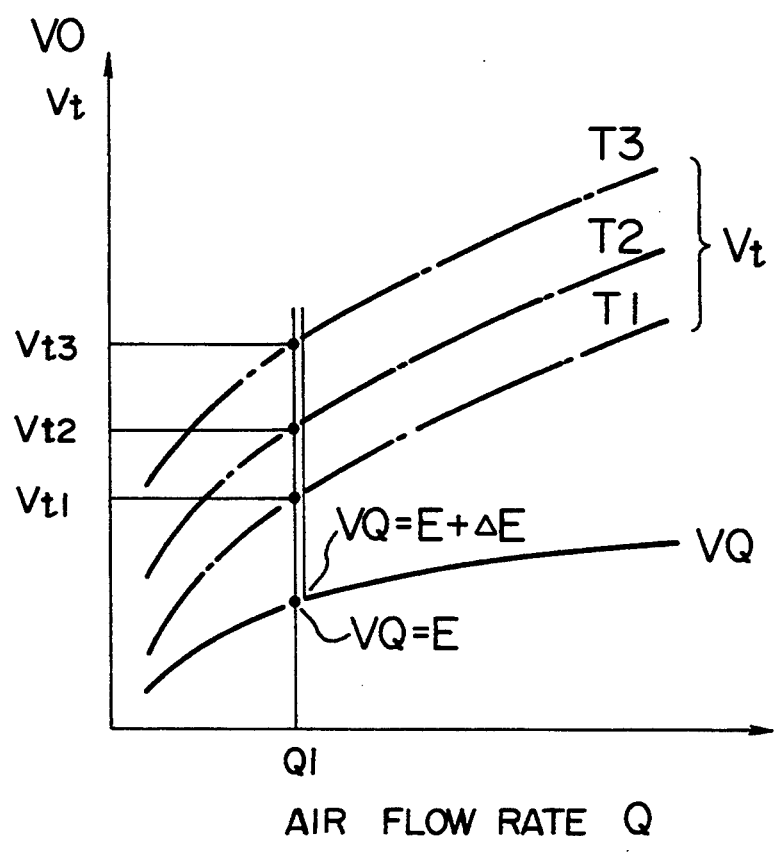

F I G. 29
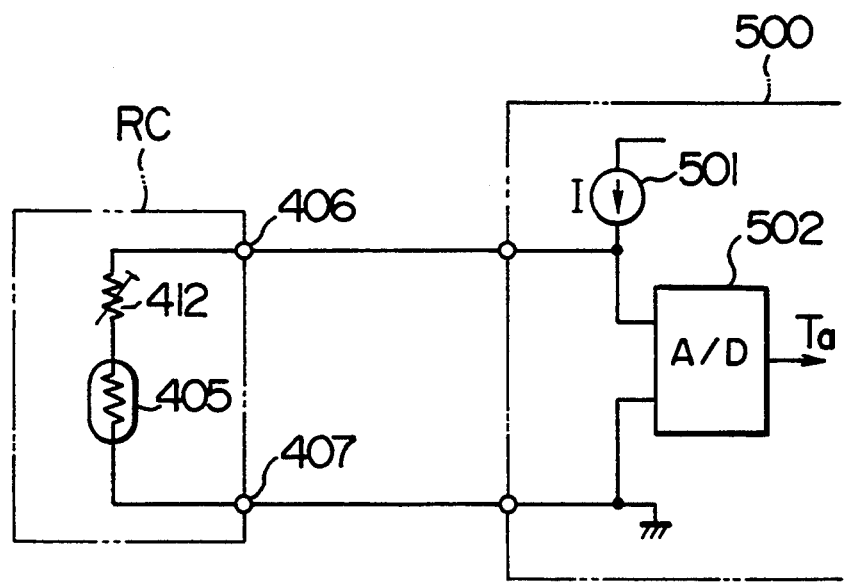
F I G. 30
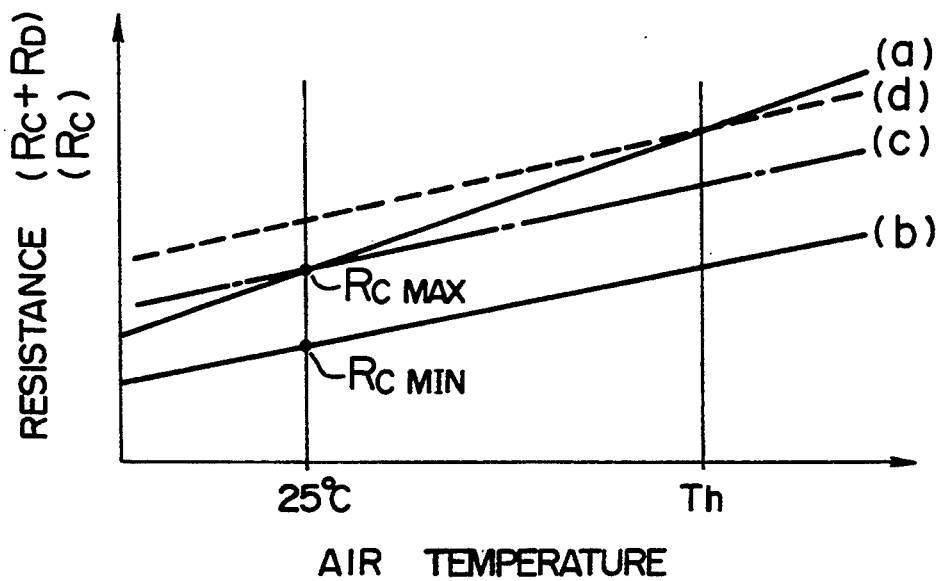

METHOD AND SYSTEM FOR MEASURING AIR FLOW RATE

BACKGROUND OF THE INVENTION

The present invention relates to a system and method for measuring an air flow rate. More specifically, the invention relates to a system and method for measuring an air flow rate suitable for application in an intake air flow measuring device of an automotive internal combustion engine.

In an automotive engine, it is a trend to employ an electronic control system for primarily controlling a fuel flow rate and/or a spark ignition timing with high precision and high accuracy employing a microcomputer in order to satisfy requirements for protection of the environment and for improvement of fuel economy. In such electronic control system, a plurality of sensors and actuators are required for obtaining information from the engine. Particularly, an air flow measuring device for an intake air introduced into the engine and an air temperature measuring device for an air introduced into the engine are essential for controlling a fuel injection amount and the spark ignition timing.

As an example of a measuring system from the background set forth above, having an air temperature measuring function in addition to production of an air flow indicative signal, utilizing an air flow measuring device, has been disclosed in Japanese Examined Patent Publication No. 1-100423. In this example, only method for obtaining the signals have been discussed and no disclosure is provided for transmission of the detection signals.

In order to achieve improvement of fuel economy of an automotive vehicle, it is important to reduce a weight of the vehicle per se together with precise control by the electronic control.

SUMMARY OF THE INVENTION

It is an object of the present invention to provide a system and a method for measuring an air flow, which permits reduction of a weight of an automotive vehicle.

By multiplexing output signals, wire harness can be reduced to contribute for reduction of weight. An air flow measuring system, in an embodiment of the invention, exposes a probe to an air. Therefore, a function for measuring an air temperature at the same time is added. Then, a signal indicative of the air temperature is formed as a voltage signal and a signal indicative of an air flow rate is formed as a pulse signal. Furthermore, a circuit for superimposing both signals are integrally provided in the air flow measuring system so that the signals can be transmitted through a single output path. Also, a filter having the same time constant with the superimposing circuit is provided in an input device which receives the multiplexed signal for demodulating both signals.

By forming the air flow rate indicative signal as a switching signal and the air temperature indicative signal as the voltage signal, a wire harness for one set of output signal can be eliminated in an automotive vehicle. Also, since the air temperature measuring function and the superimposing circuit are integrally incorporated in the air flow measuring system, the overall system becomes compact and light weight to contribute reduction of weight of the vehicle. Furthermore, since the time constant of the filter of the input device is set to be equal to the time constant of the signal superimposing circuit of the air flow measuring system, signals having reduced amount of noise can be obtained as detection signals.

BRIEF DESCRIPTION OF THE DRAWINGS

FIG. 14 is a circuit diagram of an air flow measuring unit in the air flow measuring system;

FIG. 17 is illustration showing a plan view and a sectional view of a micromodule to be employed in the air flow measuring system;

FIG. 18 is a circuit of another embodiment of the air flow measuring system according to the invention;

FIG. 22 is a characteristic chart showing a air flow to voltage characteristics of the air flow measuring unit;

FIG. 29 is a circuit diagram of the air temperature measuring unit; and

FIG. 30 is a characteristic chart showing a relationship between a resistance value and a temperature.

DESCRIPTION OF THE PREFERRED EMBODIMENT

Embodiments of the present invention will be discussed hereinafter with reference to the drawings.

Figure 1:
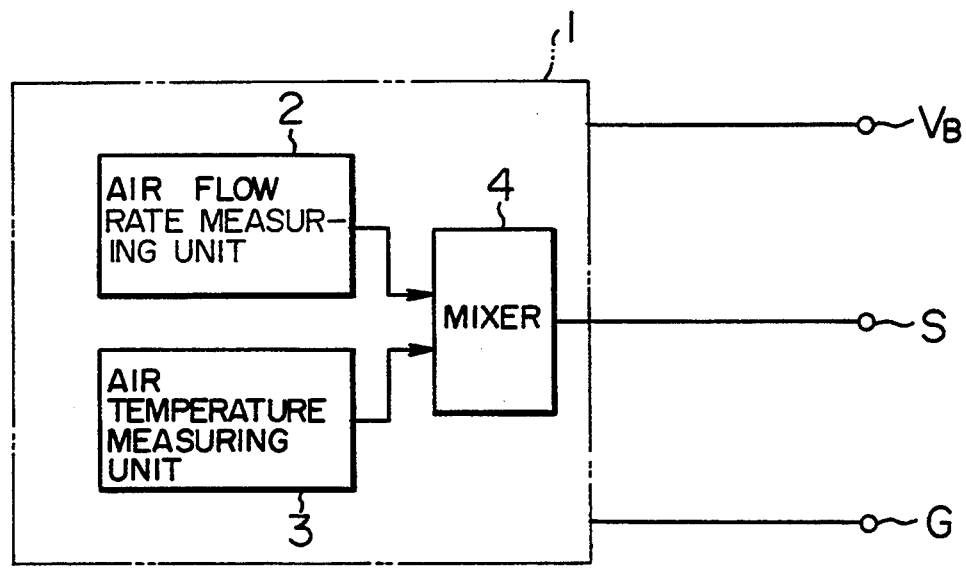
FIG. 1 is a block diagram of an embodiment of an air flow measuring system according to the present invention.
Figure 2:
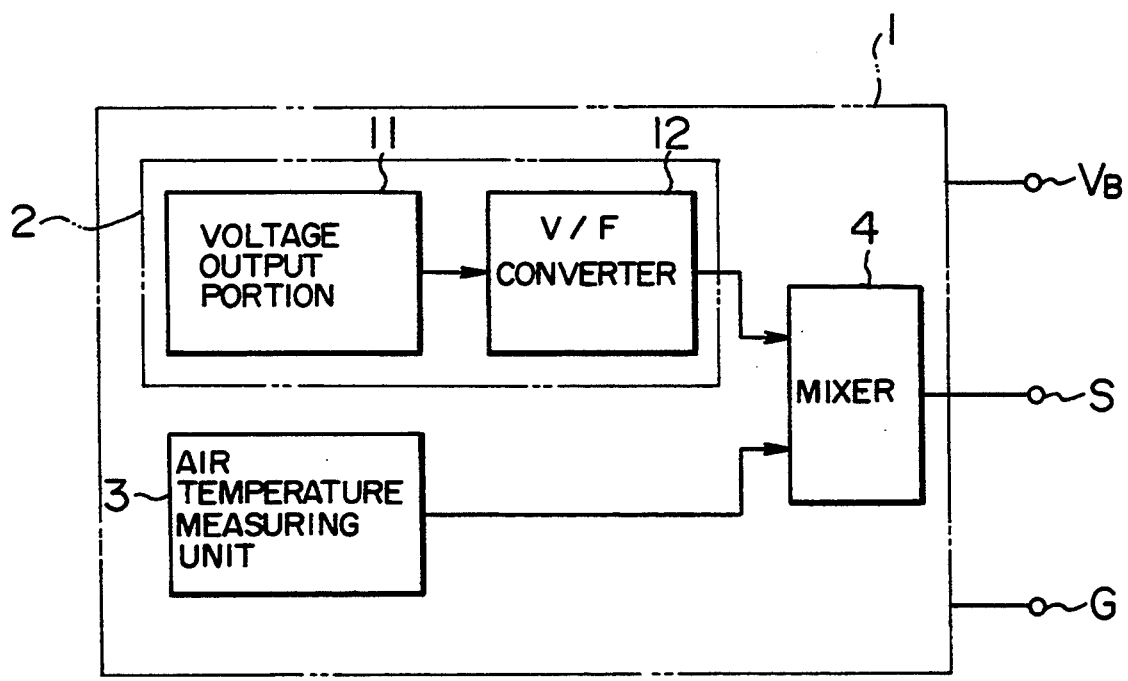
FIG. 2 is a detailed block diagram of the air flow measuring system according to the present invention.
Figure 3:
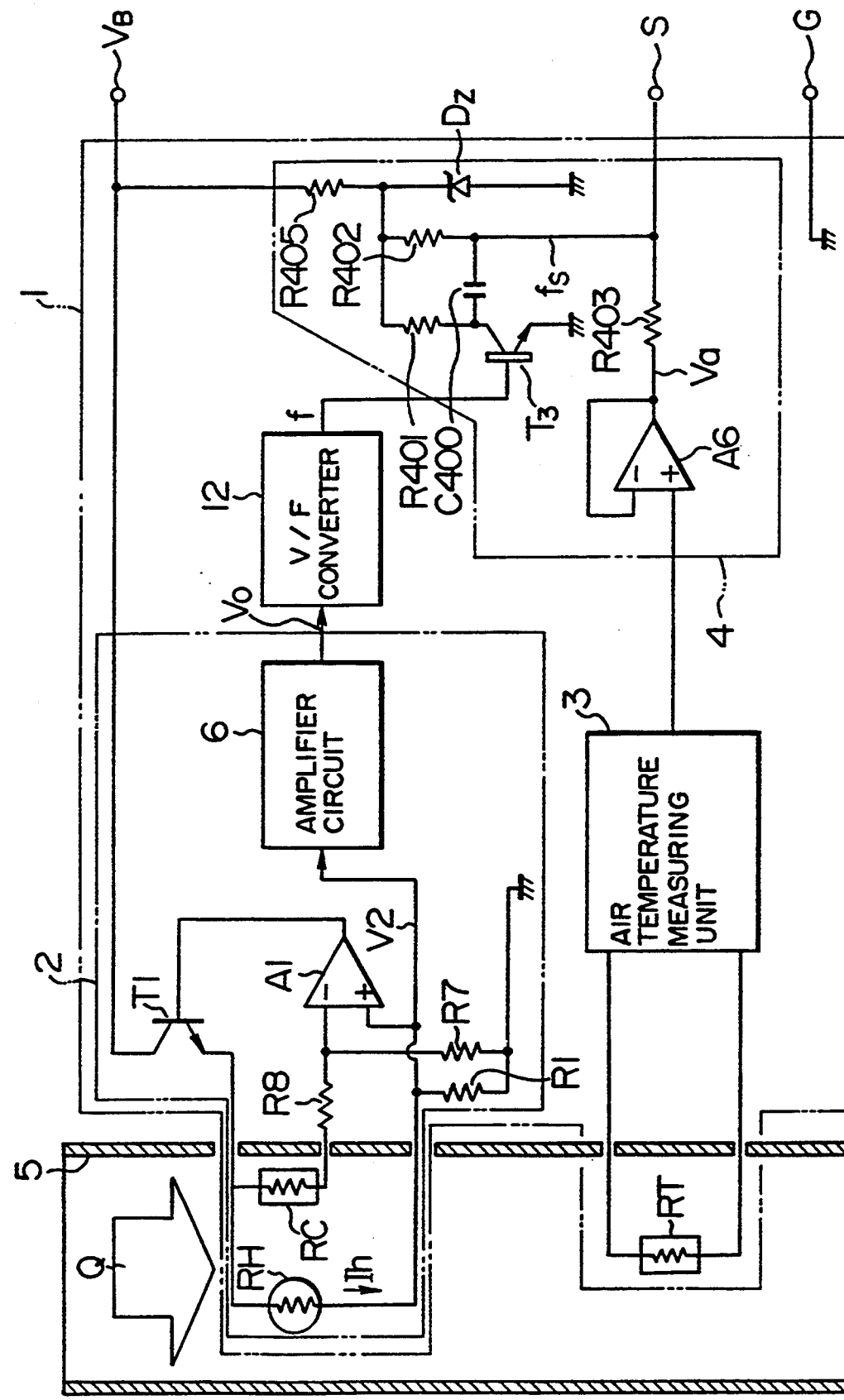
FIG. 3 is a circuit diagram of the embodiment of the air flow measuring system according to the invention.
Figure 4:
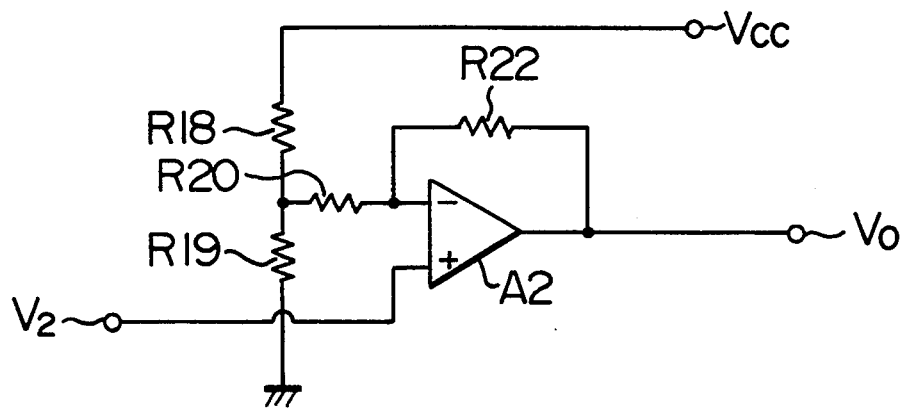
FIG. 4 is a circuit diagram of an amplifier circuit to be employed in the air flow measuring system.
Figure 6:
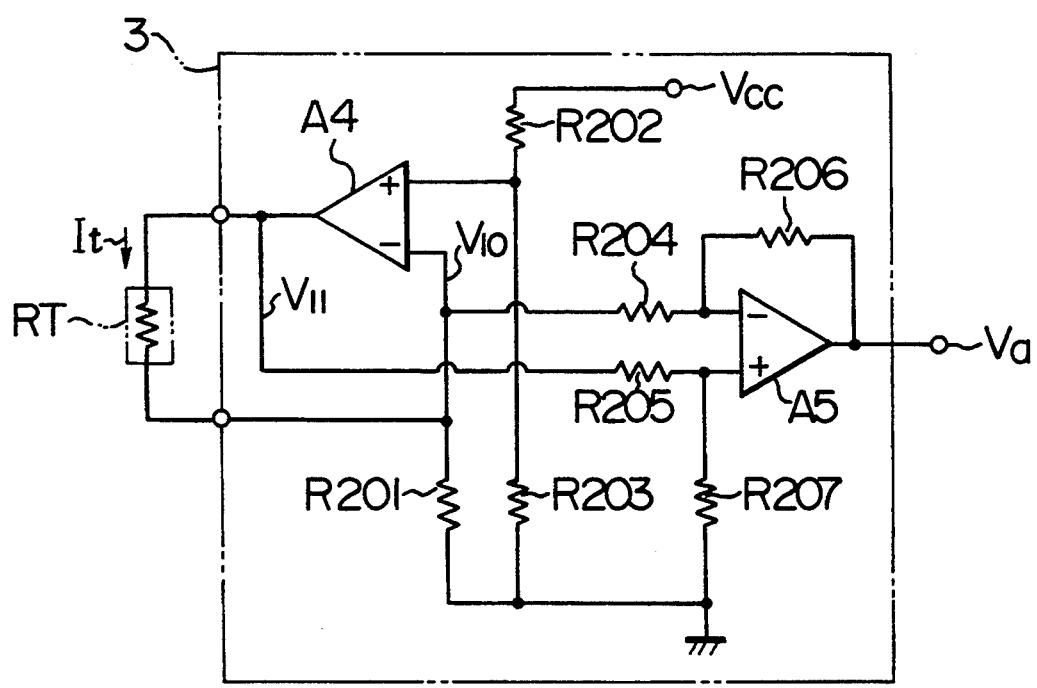
FIG. 6 is a circuit diagram of an embodiment of an air temperature measuring circuit to be employed in the air flow measuring system.
Figure 5:
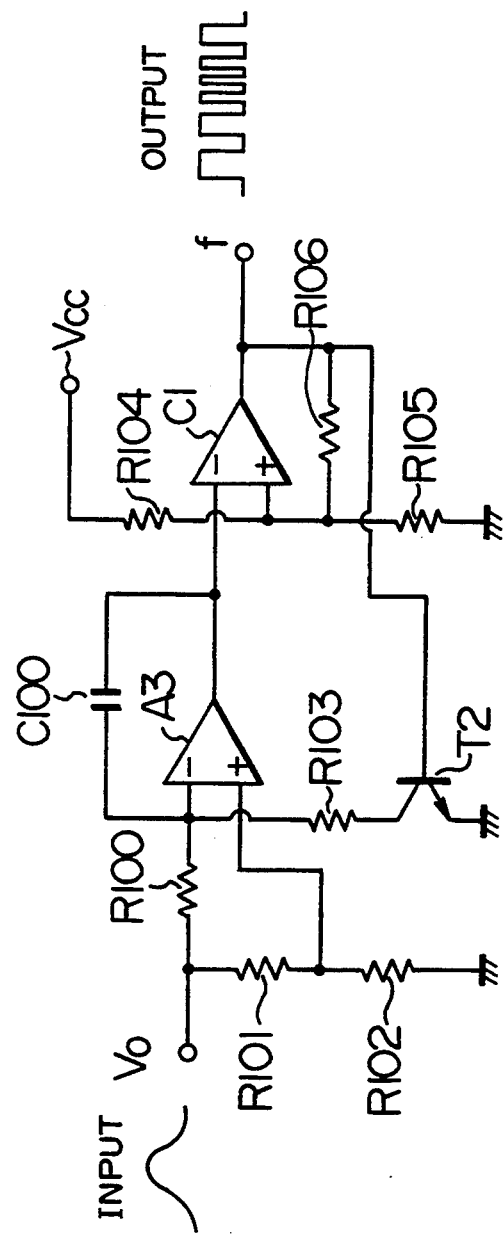
FIG. 5 is a circuit diagram of a voltage-frequency converter to be employed in the air flow measuring system.
Figure 8A:
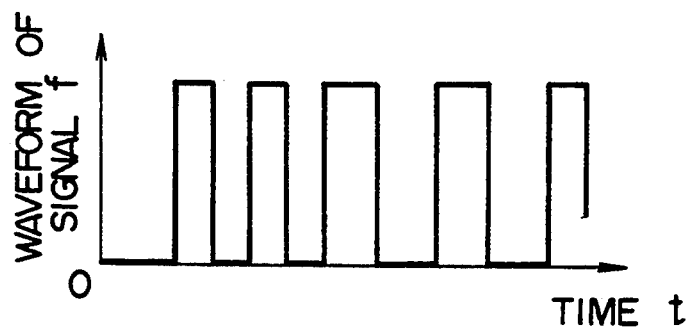
FIGS. 8A, 8B and 8C are waveforms of various portions of the air flow measuring system.
Figure 8B:
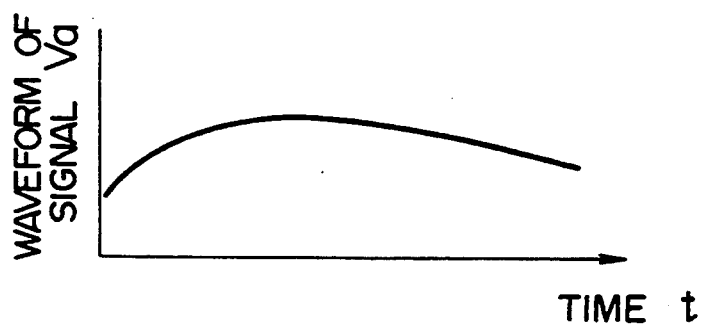
Figure 8C:
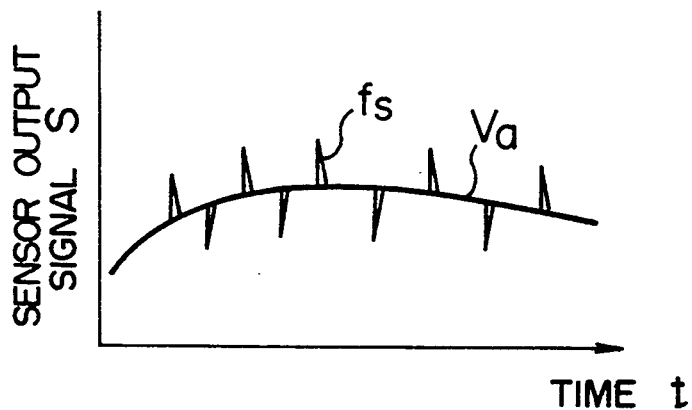
Figure 9:
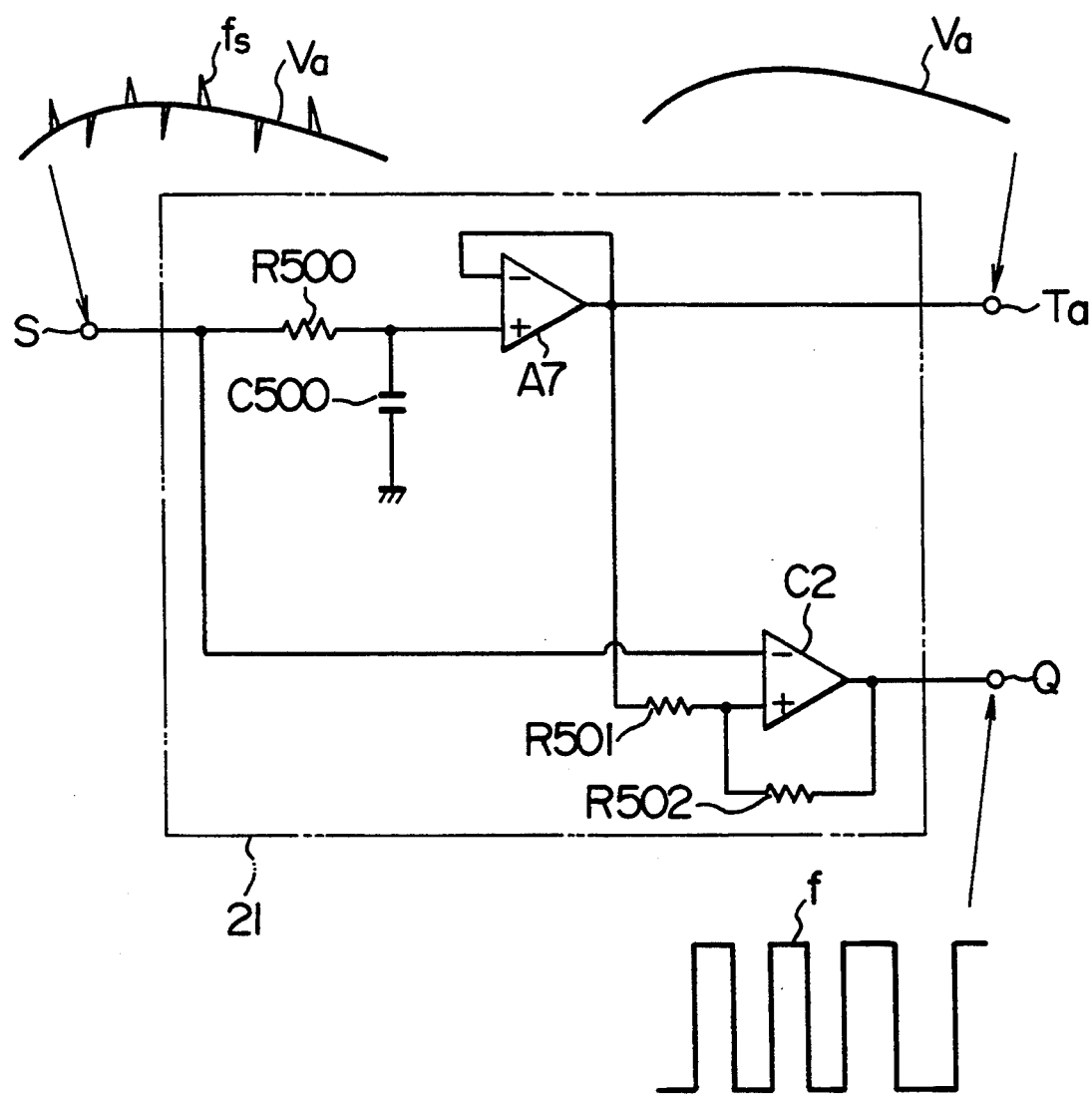
FIG. 9 is a circuit diagram of an embodiment of an input device receiving a signal from the air flow measuring system of the present invention.

FIG. 1 is a block diagram of the present invention, FIG. 2 is a block diagram showing a construction of an air flow measuring unit, FIG. 3 is a circuit diagram of an overall air flow measuring system, FIG. 4 shows an amplifier circuit of the air flow measuring unit, FIG. 5 shows a voltage-frequency (V-F) converting circuit of the air flow measuring unit, and FIG. 6 is a detailed circuit of the air temperature measuring unit. Also, FIGS. 7 and 8 are operational waveforms, FIG. 9 is a circuit diagram of an input unit of an input device.

In FIG. 1, the reference numeral 1 denotes the air flow measuring system, 2 denotes the air flow measuring unit, 3 denotes an air temperature measuring unit, 4 denotes a mixer, $V_B$ denotes a direct current power source +, G denotes a direct current power source −, and S denotes an output signal. Namely, an output signal of the air flow measuring unit 2 and an output signal of the air temperature measuring unit 3 are mixed by the mixer 4 and output as a single output signal S. As shown in FIG. 2, the air flow measuring unit 2 includes a voltage output portion 11 and the V-F converter circuit 12 for converting the output voltage of the voltage output portion into a frequency.

Next, the circuit construction of an embodiment of the present invention will be discussed in detail with reference to FIGS. 3~6.

In FIG. 3, 5 denotes an air passage, through which an air as an object to be measured flows. In case of an automotive vehicle, the air passage is a part of an air intake pipe between an air cleaner and an engine. In this air passage 5, a heating resistor RH, an air temperature measuring resistor RC for temperature compensation in order to heat the heating resistor RH at a constant temperature, and a temperature sensitive resistor RT for measuring an air temperature. The heating resistor RH and the air temperature measuring resistor RC form a bridge circuit with resistors R8, R1, R7, an operational amplifier A1 and a transistor T1. By this, the heating resistor RH is controlled according to the following equation (1) and is supplied a heating current Ih. On the other hand, a heating power of the heating resistor and a heat amount to be transmitted to an air from the heating resistor are expressed by the following equation (2). Therefore, the heating current Ih becomes a function of an air flow rate Q.

$$RH = \frac{R1}{R7}(RC + R8) \quad (1)$$

$$Ih^2 RH = (A + B\sqrt{Q})(Th - Ta) \quad (2)$$

wherein
RH: resistance value of a heating resistor RH;
RC: a resistance value of the air temperature measuring resistor RC and depending upon an air temperature Ta;
A, B: constant
Th: a temperature of the heating resistor; and
Ta: an air temperature The heating current Ih is detected by the resistor R1 to obtain an air flow rate signal $V_2$. By establishing a bridge connection with the heating resistor RH and the air flow detecting resistor RC, high speed response of the detection signal relative to variation of the air flow rate can be achieved. The air flow rate signal $V_2$ may fluctuates due to tolerance of individual air flow meter produced through mass-production for error in dimension of the heating resistor, arrangement in the air passage 5. In order to absorb this fluctuation and to match with the input characteristics of the V-F conversion circuit in the next stage, an amplifier circuit is employed for performing $V_2 \rightarrow V_0$ conversion. The construction of the amplifier circuit is illustrated in FIG. 4, in which an offset and a gain of an operational amplifier A2 is adjusted by resistors R18, R19, R20 and R22. The F-V converter 12 is constructed as shown in detail in FIG. 5. Charging and discharging for the capacitor C100 by a constant current determined by a differential voltage between a voltage derived by dividing the air flow rate signal $V_2$ as an input voltage with resistors R101 and R102, and a resistor R100 is controlled by a capacitor 9 and a transistor T2 so that the input analog voltage signal $V_0$ as an air flow detection voltage signal is converted into a pulse signal having a frequency f which is proportional to $V_0$, which pulse signal will be occasionally referred to as air flow detection frequency signal. A relationship between the air flow detection voltage signal $V_0$ and the frequency f can be expressed by the following equation (3).

$$f = \frac{V_0}{4 \times C100 \times R100 \times \Delta Vr} \quad (3)$$

wherein R101=R102, 2×R100=R103
ΔVr: a hysteresis voltage of the capacitor C1 (determined by R104, R105 and R106).

Next, discussion will be given for measurement of the air temperature. For this purpose, the circuit operation of the air temperature measuring unit 3 will be discussed with reference to FIG. 6. To the temperature sensitive resistor RT, a constant current It is applied, which constant current is determined by a reference voltage Vcc provided in the circuit and resistors R202, R203 and R201 according to the following equation (4).

$$It = \frac{R203}{R202 + R203} \times \frac{Vcc}{R201} \quad (4)$$

On the other hand, the resistance value of the temperature sensitive resistor RT is expressed by the following equation (5).

$$RT = RTO(1 + \gamma ta) \quad (5)$$

wherein
RT: resistance value of the temperature sensitive resistor;
RTO: a known resistance value of the temperature sensitive resistor at a reference temperature;
γ: a resistor temperature coefficient;
ta: a temperature of air Accordingly, the both terminal voltages $V_{10}$ and $V_{11}$ of the temperature sensitive resistor RT can be expressed by the following equations (6) and (7).

$$V_{10} = It \times R201 \qquad (6)$$

$$V_{11} = It \times RTO(1+\gamma ta) + It \times R201 \qquad (7)$$

$V_{10}$ and $V_{11}$ of the foregoing equations (6) and (7) becomes air temperature voltage signal Va as expressed by the following equations (8) and (9) by an operational amplifier A5.

$$Va = \frac{R206}{R204} (V_{11} - V_{10}) \qquad (8)$$

$$Va = \frac{R206}{R204} \times It \times RTO(1+\gamma ta) \qquad (9)$$

wherein R204=R205 and R206=R207

Figure 7A:
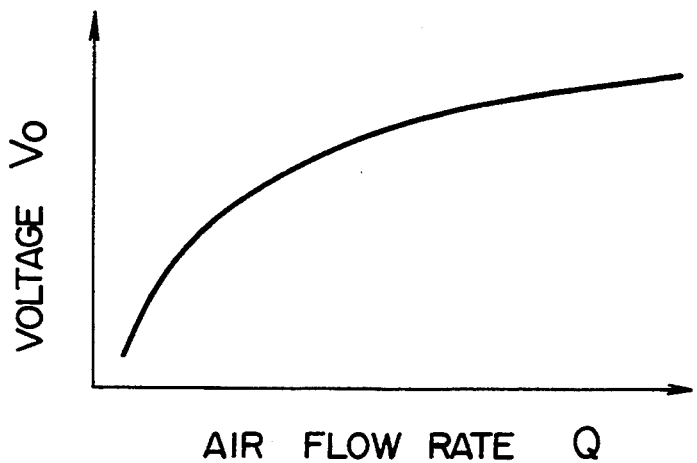
FIGS. 7A, 7B and 7C are waveforms of various portions of the air flow measuring system.
Figure 7B:
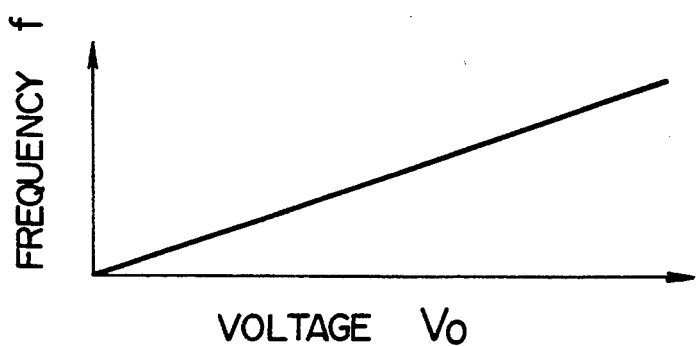
Figure 7C:
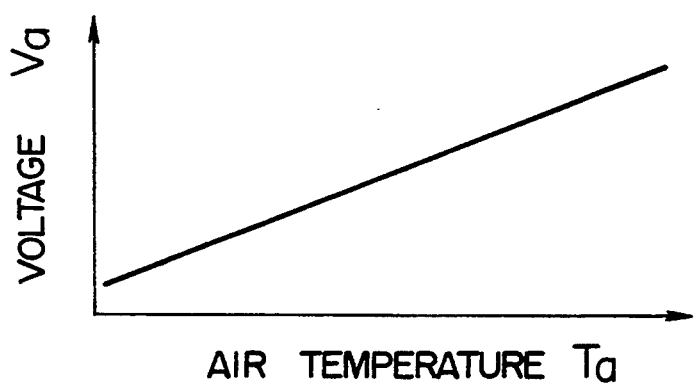

The foregoing air flow signal and air temperature signal are shown in FIG. 7. Namely, from the equation (2), the air flow rate Q and air flow detection voltage signal $V_0$ become substantially four power function as shown in FIG. 7A. On the other hand, the voltage $V_0$ of the air flow detection voltage signal and the frequency f of the air flow signal becomes as illustrated in FIG. 7B. Furthermore, the relationship between the air temperature Ta and the air temperature voltage signal Va becomes as illustrated in FIG. 7C.

Next, discussion will be given for an operation of the mixer circuit 4.

The air temperature voltage signal Va is output to an operational amplifier A6 which is a low impedance output circuit and to an output terminal S via a resistor R403. On the other hand, air flow detection frequency signal f drives a transistor T3 between ON and OFF. The collector of the transistor T3 is connected to the output terminal S via a capacitor C400. R402 and R405 are resistors and Dz is a Zener diode for obtaining a regulated voltage. Here, the air flow detection frequency signal f is converted into a differentiated waveform fs having a time constant $\tau$ determined by the capacitor C400 and resistors R401, R402 and R403. The operational waveforms of this circuit become as illustrated in FIGS. 8A and 8B. FIG. 8A shows a waveform of the air flow detection frequency signal f. FIG. 8B shows a voltage of the air temperature voltage signal Va and FIG. 8C shows a signal waveform at the output terminal S. Namely, a waveform of the air temperature voltage signal Va superimposed thereon a spike signal fs having a frequency f and the time constant $\tau$.

Next, an embodiment of an input device 20 for inputting the above-mentioned detection signal will be discussed with reference to FIGS. 9 and 10. In FIG. 9, R500 denotes a resistor, C500 denotes a capacitor, and A7 denotes an operational amplifier. Also, C2 denotes a comparator, R501 and R502 denote hysteresis resistors for the comparator C2. An input signal S is passed through a low pass filter R500 and C500 having the same time constant to the time constant $\tau$ of the mixer 4 so that a signal demodulated for reproducing the voltage Va indicative of the air temperature with high precision can be output at the first output Ta. By obtaining a difference between this voltage Va and the input signal S, a spike signal fs can be obtained. Furthermore, the signal fs is demodulated into the air flow detection frequency signal f by a hysteresis circuit comprising C2, R501 and R502 and appears at the output Q.

Figure 10:
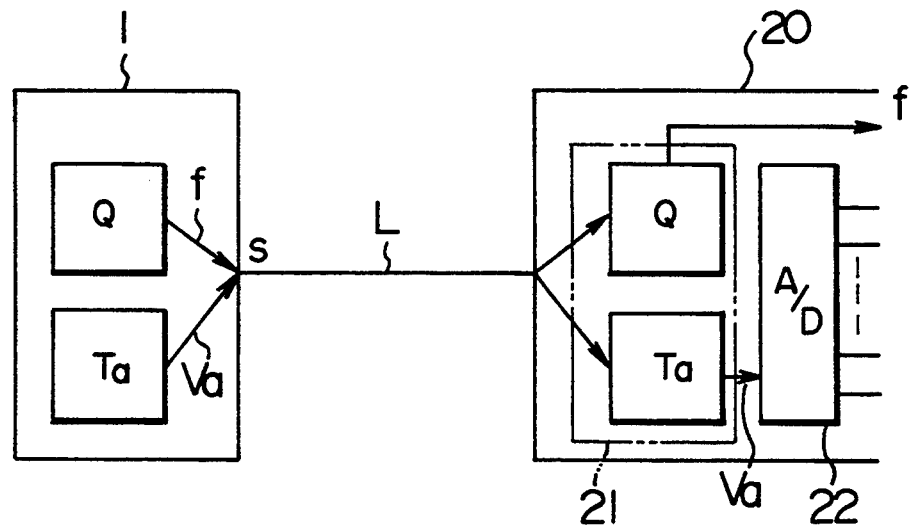
FIG. 10 is an illustration showing an example, in which the air flow measuring device and the input device are connected through a single signal path.

FIG. 10 shows a connection between the first flow measuring system 1 according to the present invention and the input device 20. Namely, a composite signal of the air flow detection frequency signal f representative of the air flow rate Q and the air temperature voltage signal Va representative of the air temperature Ta is transmitted to a single transmission line L, and applied to a control process via separation into an airflow rate component Q and an air temperature component Ta, demodulation and A/D conversion.

With the embodiment set forth above, it is possible to provide the input device, in which the air flow rate indicative signal and the air temperature indicative signal can be transmitted through the single transmission line, and which can reproduce the signals with high precision after demodulation.

The foregoing embodiment employs a sequence of pulse signal having the frequency f as the air flow detection frequency signal. Next, discussion will be given for an embodiment, in which the air flow detection signal converted from the air flow detection voltage signal is a digital signal. The digital signal will be hereinafter referred to as a digital air flow rate data signal.

Figure 11:
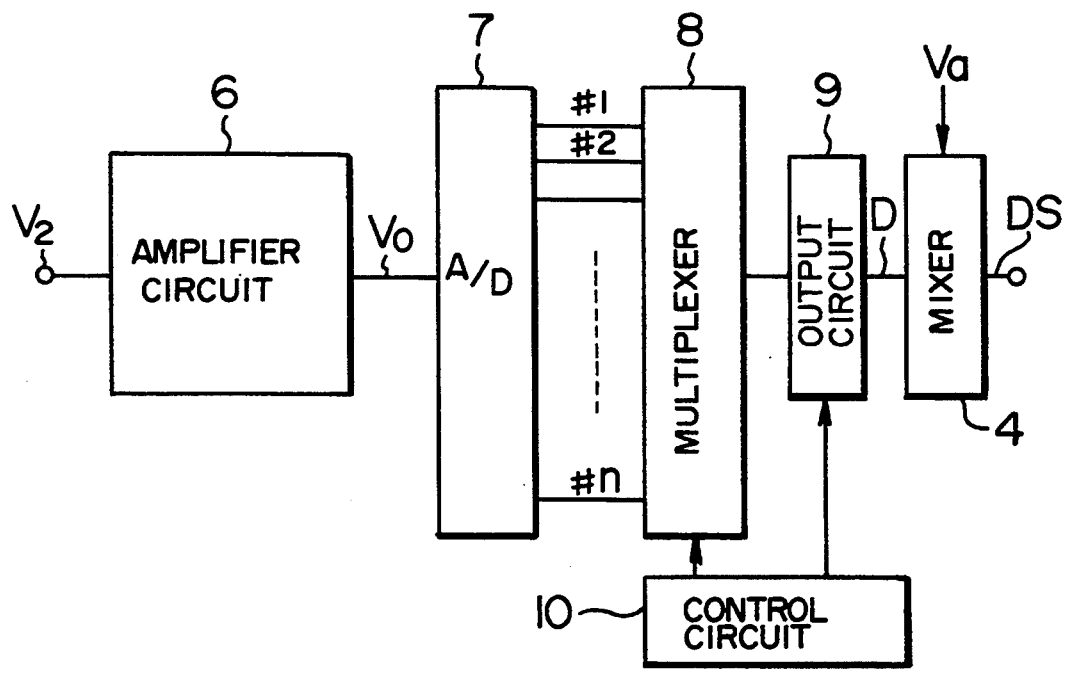
FIG. 11 is a block diagram of a circuit for converting an air flow rate detection signal into a digital signal.
Figure 12:
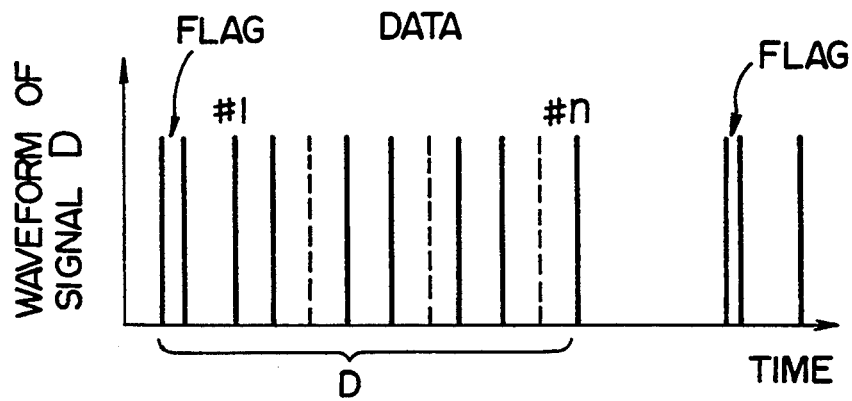
FIG. 12 is a waveform in the circuit of FIG. 11.

FIG. 11 is a block diagram showing a circuit for converting the air flow detection voltage signal $V_2$ into the digital air flow rate data signal. An analog voltage output $V_0$ of the amplifier circuit 6 is converted into a necessary bits (e.g. 10 bits) of digital air flow rate data signal by an A/D converter 7. The digital air flow rate data signal is read out in sequence from the first bit by a multiplexer 8 and output as a serial pulse signal D via the output circuit 9. On the other hand, to the output circuit 9 and the multiplexer 8, a control circuit 10 is connected. As shown in FIG. 12, a flag indicative of initiation of data transmission is output to be added to the leading end of the input data. The serial pulse signal D is mixed with the air temperature voltage signal Va by the mixer 4 for superimposing as seen in the waveform of FIG. 8C to output an the output signal as the digital air flow rate data signal DS.

Figure 13:
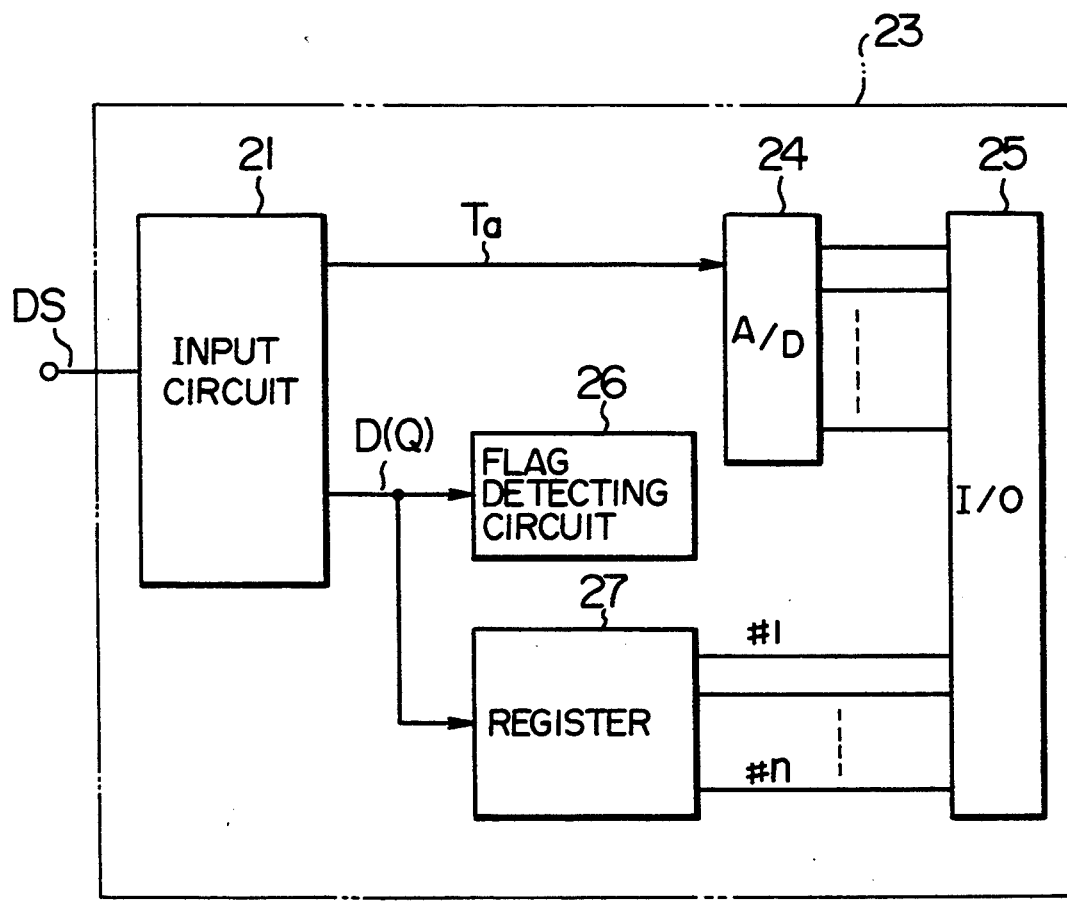
FIG. 13 is a circuit diagram of another embodiment of the input device for receiving a signal from the air flow measuring system of the present invention.

FIG. 13 shows the input device in the case where the digital air flow rate data signal DS is employed as the input signal. An input circuit 21 is similar to the former embodiment of FIG. 9. Namely, with the operational amplifier A7 and the comparator C2 of FIG. 9, the digital air flow rate data signal is demodulated into the air temperature voltage signal Va representative of the air temperature Ta and the serial pulse signal DQ indicative of the air flow rate Q. The air temperature data Ta of the air temperature voltage signal Va is converted into a digital signal by the A/D converter 24 and input to an I/O circuit 25 of a processing unit. On the other hand, the air flow rate indicative serial pulse signal DQ is stored in a register R, to which initiation of writing is commanded by a flag detection circuit 26. When all bits are stored, it is input to the I/O circuit 25 of the processing unit.

According to this embodiment, even when the air flow detection signal is the digital signal, a wire harness required for a necessary bits may be used as a single transmission path commonly to the air temperature signal.

Figure 15:
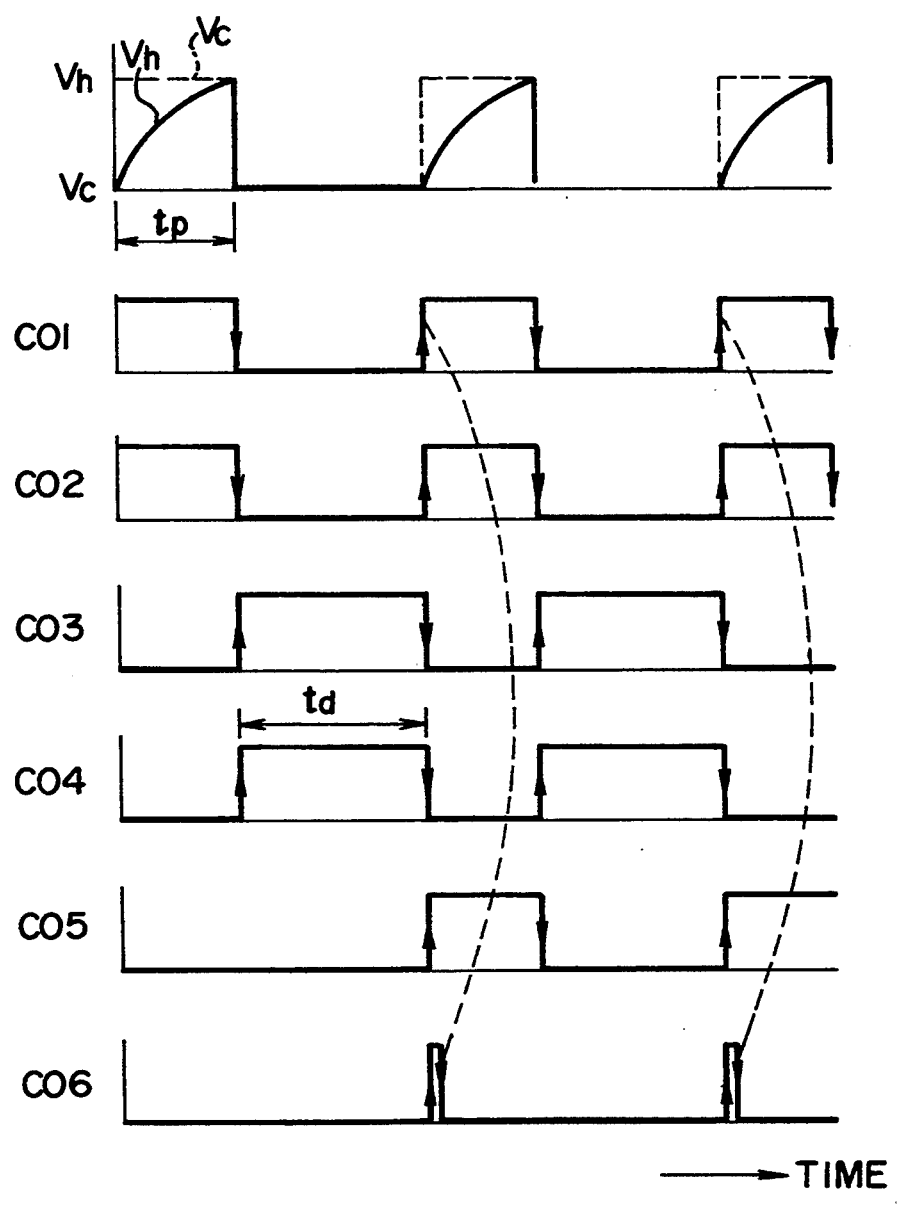
FIG. 15 is a waveforms for illustrating an operation of the circuit of FIG. 14.

In the foregoing embodiments, a voltage (current) output system employing abridge circuit in the air flow measuring system is illustrated. Next, an embodiment of a frequency output system, in which switching of the heating resistor RH is directly controlled, will be discussed. FIG. 14 is a circuit diagram and FIG. 15 shows operational waveforms. Operation will be discussed briefly.

At first, before turning ON of power source, the terminal voltage Vh of the heating resistor RH is 0 and thus lower than a voltage Vc which is applied to the air temperature measuring resistor RC and the resistor R8 by a constant current I. Therefore, the output CO1 of a comparator C3 becomes "1". Also, the output CO2 of an OR gate OR becomes "1". Then, a transistor T4 turns ON. Subsequently, after a period td set in an one-shot multivibrator OS, CO4 turns from "1" to "0". Then, CO5 is turned from "0" to "1" to turn the output Q1 of a flip-flop FF to "1". By this, the transistor T4 turns IN again. At this time, at the timing where CO1 turns from "1" to "0", the flip-flop FF is reset to turn the output thereof into "0", By repeating the foregoing operation, heating and cooling of the heating resistor RH is repeated. The frequency f is expressed by the following equation (10). Since tp is a function of the air flow rate, the frequency f represents the air flow rate signal $$f = \frac{1}{tp + td} \quad (10)$$

This frequency signal f is superimposed with the air temperature voltage signal Va and output as the output signal S.

With the embodiment, since all circuit operation is performed by the pulse signals, the air flow measuring system with lesser influence of electric noises or so forth can be provided.

Next, discussion will be given for the embodiment of a construction of the air flow measuring system according to the invention.

Figure 16A:
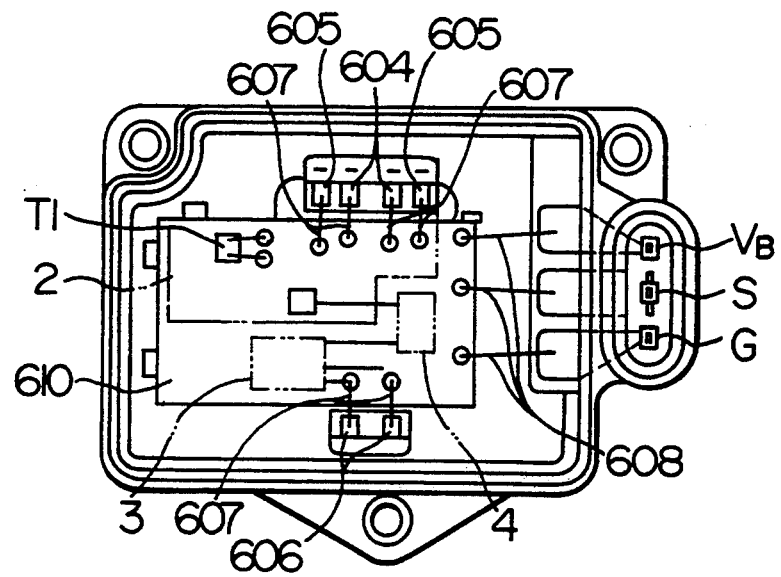
FIGS. 16A and 16B are plan view and section showing a practical construction of the air flow measuring system of the invention.
Figure 16B:
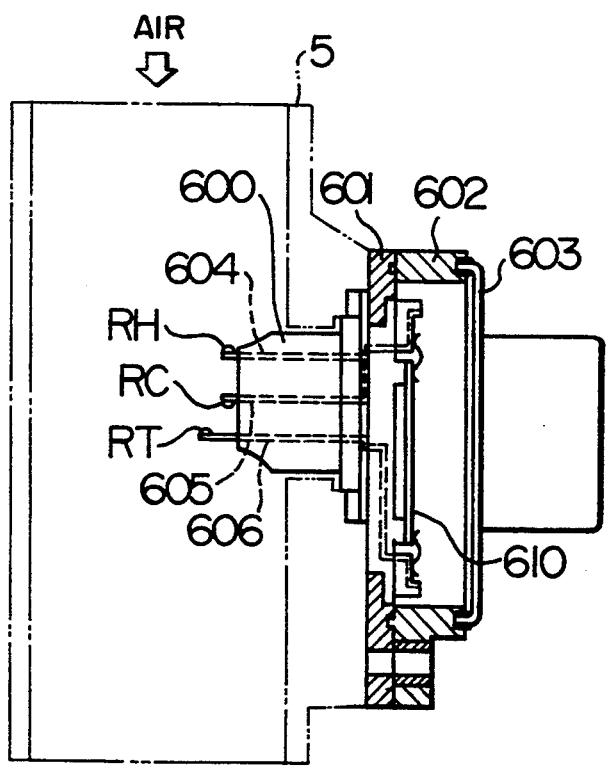
Figure 19:
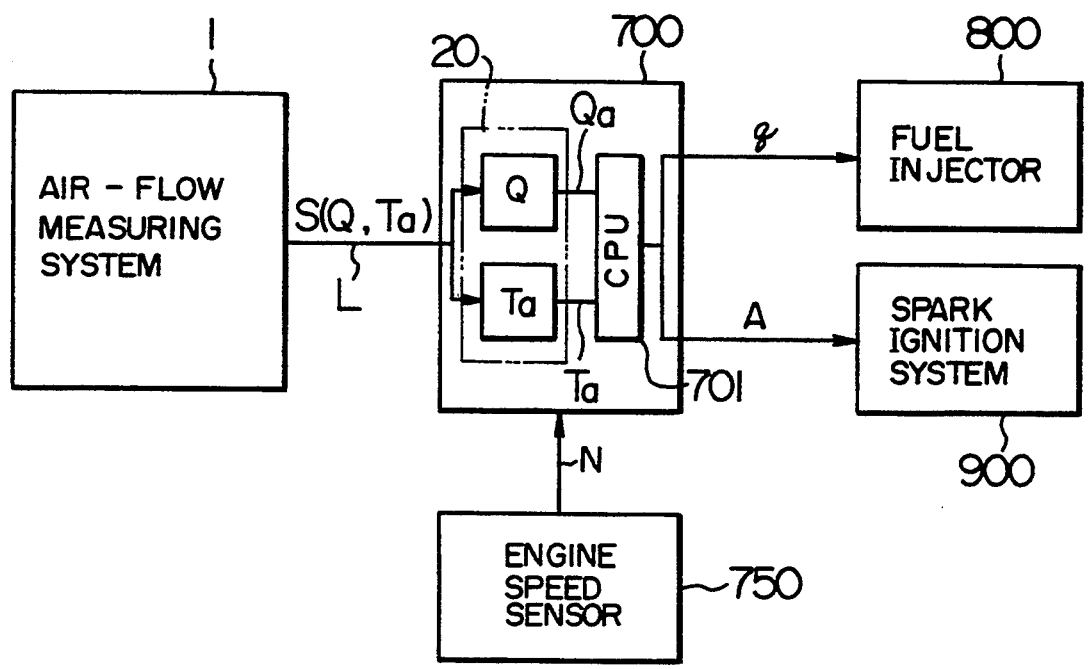
FIG. 19 is a block diagram of an engine control system, to which the air flow measuring system and the input device of the present invention are applied.

FIG. 16A is a plan view of the air flow measuring system 1, which illustrates internal construction with removing a cover, and FIG. 16B is its side elevation. 5 denotes the air passage. 601 denotes a metallic base. To this base, terminal leads 604, 605 and 606 are molded with a resin 600. To the tip ends of these terminal leads 604~606, the heating resistor RH, the air temperature measuring resistor RC and the temperature sensitive resistor RT are connected. 602 denotes a housing, in which terminals for power source $V_B$ to be connected to the outside, G and output S are molded, and is connected by way of aluminum wire bonding 608, similarly to the terminal leads.

On a circuit board, the air flow measuring portion, a mixer 4 and the air temperature measuring portion 3 are formed. One feature of the shown construction is that the air flow measuring system can be formed as a micro-modules. Namely, as shown in FIG. 17, on a substrate 170, the circuit of FIG. 6 is integrated as an integrated circuit 171. Also, the substrate 170 is provided with a connection terminal 172 for external connection and coated with an insulating resin 173. With this embodiment, a compact air flow measuring system can be obtained. Also, by forming the air flow measuring system as a micro-module, an interference of wires with the air flow measuring system can be avoided to permit rising of a noise margin. Furthermore, by employing the micro-module, general applicability is high for convenience. In addition, by integrating a power supply circuit for supplying power to the temperature sensitive resistor with the air flow measuring unit and arranging in the vicinity of the temperature sensitive resistor, a measurement error due to voltage drop by the wiring or so forth can be eliminated.

The foregoing illustrates embodiments, in which the air temperature measuring resistor RC of the air flow measuring unit 2 and the air temperature sensitive resistor RT of the air temperature measuring unit 3 are provided independently of each other. Next, another embodiment, in which the air temperature voltage signal Va is obtained from the air flow measuring unit 2 employing the temperature sensitive resistor RT, will be discussed. FIG. 18 shows this embodiment. The current and terminal voltage flowing through the air temperature measuring resistor RC inserted in an edge of the bridge contains the air flow rate indicative signal together with the air temperature indicative signal. Only the air temperature indicative signal can be extracted by deriving a resistance value of the air temperature measuring resistor RC. FIG. 18 shows the circuit construction for deriving the air temperature voltage signal as the air temperature indicative signal by calculating $V_1/V_3$ employing a divider circuit 15. Namely, $V_1/V_3$ is expressed by the following equation (11) and thus becomes an output depending upon the resistance value of the air temperature measuring resistor RC.

$$Va = \frac{V_1}{V_3} = 1 + \frac{Rc}{R_7 + R_8} \quad (11)$$

With this embodiment, the temperature sensitive sensor RT for measuring the air temperature becomes unnecessary.

Next, discussion will be given for an embodiment of an engine control system employing the air flow measuring system and the input device according to the present invention. 1 denotes the air flow measuring system according to the present invention, which enables transmission of the air flow rate indicative signal through a single transmission path and is capable of transmission of an air flow rate information Q and an air temperature information Ta as a single signal S through a single output line L. This is demodulated by the input device 20 provided in an input unit of an engine control unit 700, into independent signals Ta and Qa. On the basis of these signals and an engine speed signal N output from an engine speed measuring system 750, an optimal fuel supply amount q and an optimal spark ignition timing A are calculated by a microcomputer A according to calculation programs. A fuel injector 8—and a spark ignition device 900 controls combustion of the engine according to the signals q and A. With this embodiment, wire harness can be reduced to provide lighter weight engine control system.

In the foregoing embodiment, since information concerning the air flow rate and the air temperature can be transmitted through the single transmission path, the wire harness can be reduced for contributing reduction of the weight of the automotive vehicle. Also, since the time constant of the filter of the input device, to which the multiplexing signal is input, is set to be equal to the time constant of the mixer circuit, the demodulated signals with high precision can be obtained. Furthermore, by arranging the current circuit for applying a voltage to the air temperature measuring resistor and by forming as a micro-module, lowering of detection error and improvement of anti-noise characteristics can be achieved.

A further embodiment which permits measurement of the air flow rate for generating the air temperature voltage signal Va from the air flow measuring portion 2 without using the temperature sensitive resistor RT.

The air temperature measuring resistor RC is adapted to provide temperature compensation for the air flow rate measured by the heating resistor RH. The current flowing through the air temperature measuring resistor RC contains the air flow indicative signal. Also, a voltage drop in the air temperature measuring resistor RC contains two information of the air temperature and the air flow rate. Accordingly, from the voltage associated with a resistance value of the air temperature measuring resistor RC, only air temperature information can be extracted.

In the shown embodiment, a circuit for detecting a predetermined specific air flow rate is provided so that the voltage associated with the resistance value of the air temperature measuring resistor RC is sampled to extract a signal corresponding to the air temperature when the circuit detects the specific air flow rate.

Figure 20:
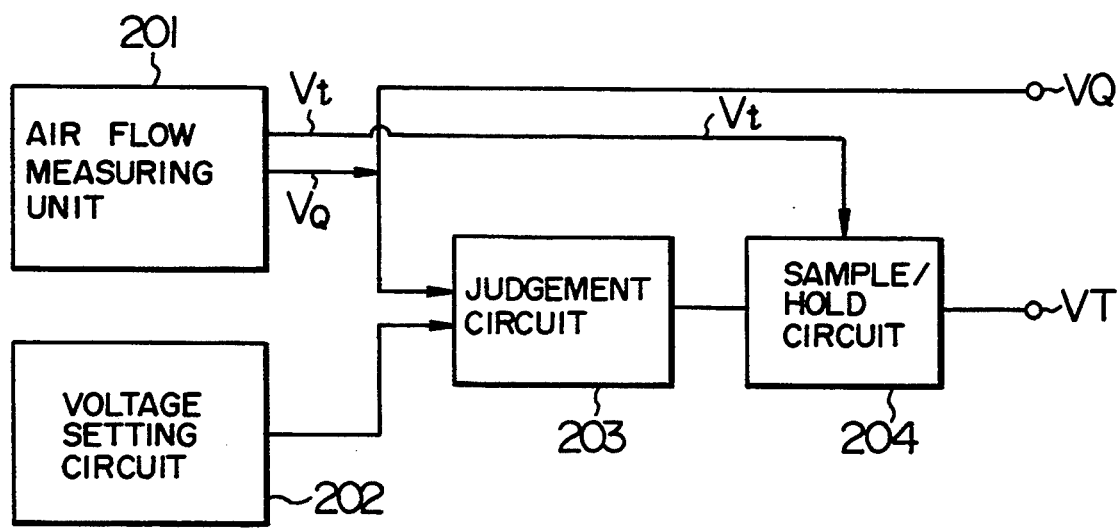
FIG. 20 is a block diagram of a further embodiment of the air flow measuring system of the invention.

In FIG. 20, 201 denotes an air flow measuring unit for measuring the air flow rate, output of which is a bridge voltage Vt depending upon an air flow rate indicative signal VQ and a resistance value of a air temperature measuring resistor. The voltage Vt corresponds to the air temperature. 202 denotes a voltage setting circuit for setting a specific value of the air flow rate indicative signal VQ. 203 denotes a judgement circuit for comparing the output of the voltage setting circuit 202 and the air flow rate indicative signal VQ and making judgement whether the air flow rate indicative signal VQ is the specific value or not. 204 is a sample/hold circuit for sampling and holding the bridge voltage Vt in response to the output of the judgement circuit to output the air temperature voltage signal Va.

Figure 21:
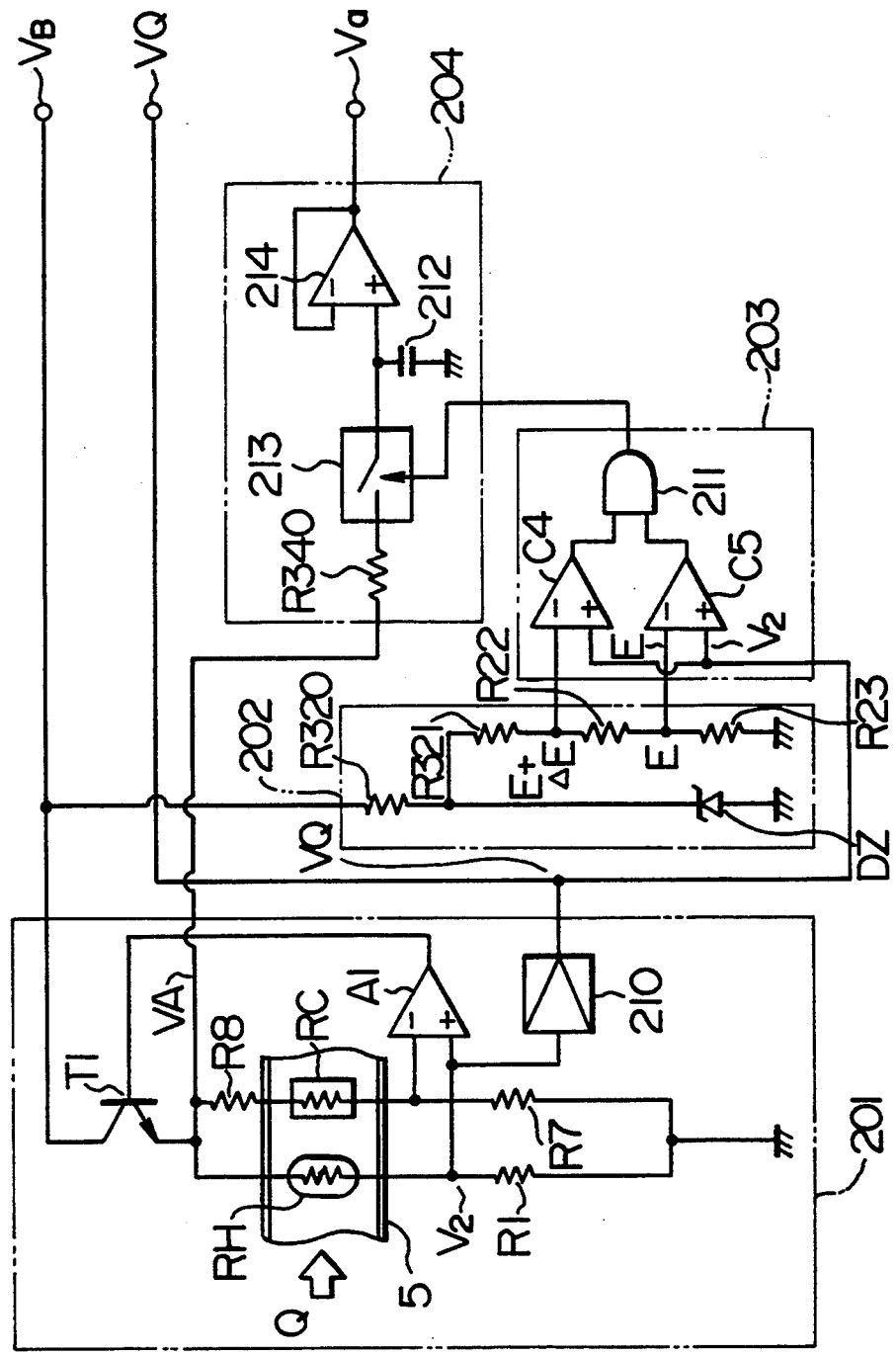
FIG. 21 is a circuit diagram of the further embodiment of the air flow measuring system of the invention.

Further concrete construction will be discussed with reference to FIG. 21.

The air flow measuring unit 201 is constructed as follows. Namely, a bridge circuit is formed with a heating resistor RH arranged in the air passage 5, the air temperature measuring resistor RC for measuring the air temperature and adjusting the heating temperature of the heating resistor, resistors R1, R7 and R8, a differential amplifier A1 and a transistor T1. The air flow rate detection signal of this circuit becomes a terminal voltage $V_2$ of the resistor R1 as will be set out later. The voltage $V_2$ is amplified by an amplifier 210 and externally output as the air flow rate indicative signal VQ. The voltage setting circuit 202 divides a constant voltage obtained from the power source voltage VB by a resistor R320 and the Zener diode DZ, with resistors R321, R322 and R323 for setting a divided voltage E and a voltage E+ΔE slightly higher (in an order of several tens mV). The judgement circuit 203 comprises a comparator C5 for detecting that the air flow rate indicative signal VQ is higher than the divided voltage E set by the voltage setting circuit 202, a comparator C4 for detecting that VQ is lower than the voltage (E+ΔE), and an AND gate 211 for taking AND of the outputs of both comparators. The sample/hold circuit 204 comprises a resistor 340, a capacitor 212, an analog switch 213 and a buffer amplifier 214.

At first, operation of the air flow measuring unit 201 will be discussed.

By the differential amplifier A1, the heating resistor RH is controlled according to the foregoing equation (1). The heating power of the heating resistor and a heat amount transmitted to the air from the heating resistor can be expressed by the foregoing equation (2) by KING's equation.

From the equations (1) and (2), the heating current Ih of the heating resistor RH is expressed by the following equation (12).

$$Ih = \sqrt{\left( \frac{(A + B\sqrt{Q})(Th - Ta)}{\frac{R1}{R7}(R8 + RC)} \right)} \tag{12}$$

Accordingly, since Ih becomes a function of the air flow rate Q, the terminal voltage $V_2$ of the resistor R1 becomes the air flow rate indicative signal. Therefore, the output VQ is obtained through the amplifier 210.

In the foregoing equation (12), the resistance value of the air temperature measuring resistor RC is expressed by the following equation (13). Accordingly, even when (Th−Ta) is varied according to variation of Ta in the equations (1) and (3), RH is varied by variation of Ta and thus Th is varied so that variation of Ta can be compensated by appropriately setting the resistance value of the resistor R8. Namely, it becomes possible to obtain the air flow measuring characteristics of the heating current in relation to the air flow rate Q with avoiding influence of the air temperature Ta.

$$RC = RC0(1 + \alpha Ta) \tag{13}$$

wherein
  RC0: value of RC at a reference temperature or 25° C.; and
  α: a temperature coefficient of RC As set forth, the heating current Ih is not influenced by the air temperature Ta. However, the bridge terminal voltage Vt is expressed by the following equations (14) and (15), and thus includes both of the air flow rate indicative heating current Ih and the air temperature.

$$Vt = (RH + R1)Ih \tag{14}$$

$$Vt = \left[ \frac{R1}{R7} \{R8 + RC0(1 + \alpha Ta)\} + R1 \right] Ih \tag{15}$$

These relationships are illustrated in FIG. 22. Although VQ has a uniform relationship with the air flow rate irrespective of the air temperature Ta, Vt has different Q-Vt characteristic curve at predetermined air temperatures T1, T2 and T3 (T1<T2<T3) as shown. Here, when the air flow rate indicative signal VQ falling between the set values E and (E+ΔE) (note, ΔE≈0) is detected by the judgement circuit 203, the analog switch 213 of the sample/hold circuit 204 is closed to charge the capacitor 212 by the bridge voltage Vt (Vt1∼Vt3). Thus, the air temperature voltage signal Va corresponding to the air temperature Ta can be obtained. Here, the set voltage E is set at the air flow rate indicative signal value VQ in the most frequently used region. For example, in case of the automotive engine control, this air flow rate region will be a range of 20∼50 kg/h. In this manner, the air flow rate indicative signal VQ and the air temperature indicative signal VT can be obtained substantially in real time manner.

Figure 23:
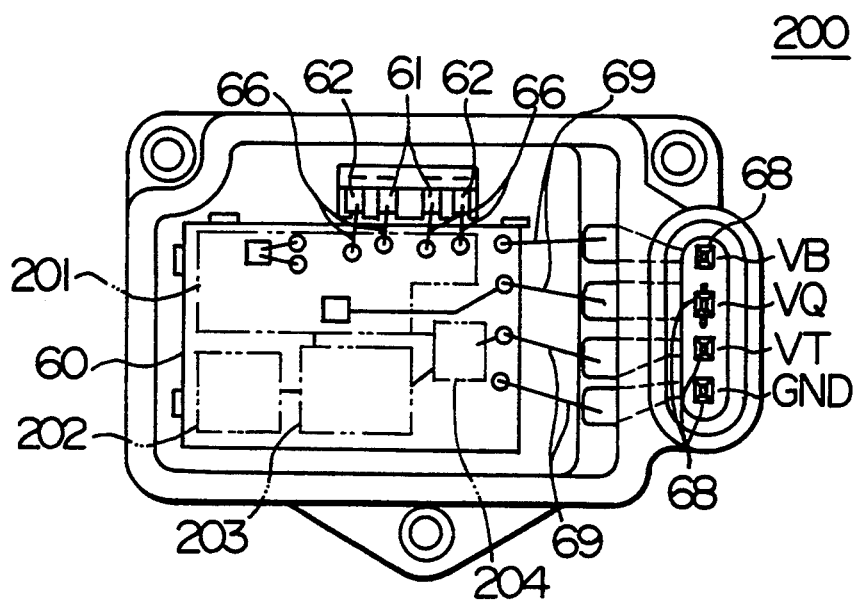
FIG. 23 is a plan view showing a practical construction of the air flow measuring system incorporating the circuit of FIG. 21.
Figure 24:
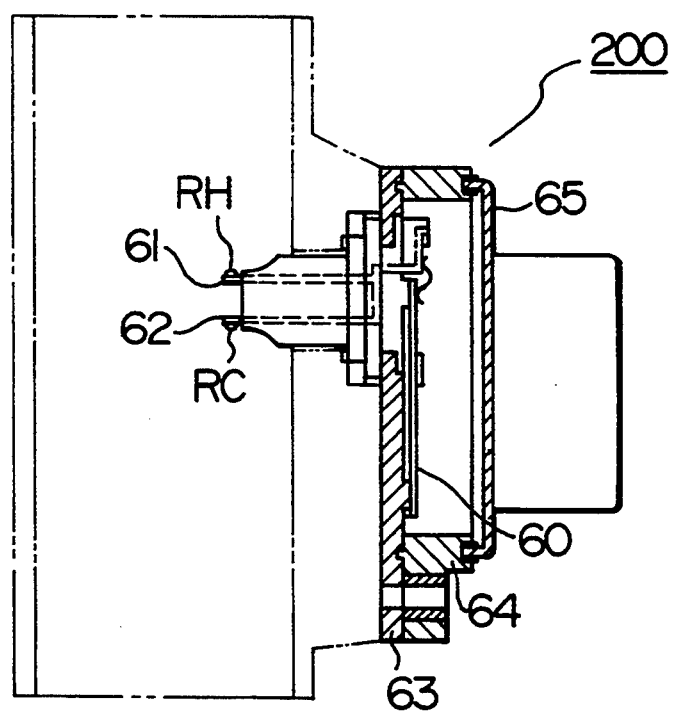
FIG. 24 is a section of the air flow measuring device of FIG. 23.

Next, a practical construction of the air flow measuring system of FIG. 20 will be discussed with reference to FIGS. 23 and 24. 60 denotes a circuit board. On the single circuit board, the air flow measuring portion 201, the voltage setting circuit 202, the judgement circuit 203 and the sample/hold circuit 204 are formed. 63 denotes a metallic base, in which lead pins 61 and 62 for securing the heating resistor RH and the air temperature measuring resistor RC are formed by insert resin molding. The lead pins 61 and 62 and the circuit board 60 are connected by a wire 66. 64 denotes a housing having a connector pin 68. The connector pin 68 is connected to the circuit board 60 via a wire 69. 65 denotes a cover. As set forth above, by mounting all circuit on the single circuit board, and providing the air temperature measuring function for the air flow measuring system, it becomes possible to provide a compact and inexpensive air flow measuring system with the air temperature measuring function.

According to this embodiment, the air flow measuring system having the air temperature output can be provided and light weight and low cost can be realized.

Next, discussion will be given for a manner to adjust the resistance value of the air temperature measuring resistor RC.

The precision in measurement of the air temperature of the air temperature measuring resistor RC is determined by the tolerance of the resistance value of the temperature sensitive resistor RC. Adjustment for absorbing tolerance of resistance value of the temperature sensitive resistor is performed by laser trimming, grinding or so forth. However, the resistance value may be fluctuated by heating of the resistor during adjusting operation. This makes adjustment quite difficult. As a result, important problem is arisen that the fluctuation of the measured signal of the air temperature is substantially large.

The shown embodiment provides the air flow measuring system, in which fluctuation of the detection signal is small.

The resistance value RC of the temperature sensitive resistor for measuring the air temperature will be expressed by the foregoing equation (13).

In the equation "13", the fluctuation of the temperature coefficient a is determined by a material of the temperature sensitive resistor, such as white gold, nickel and so forth. Therefore, the fluctuation is very small. However, $R_{CO}$ fluctuates significantly due to dimensions of the film thickness, thickness, length and so forth. The magnitude of the fluctuation reaches ±40~60% to make it impractical for use in the practical use. For suppressing fluctuation, a resistance trimming is performed. However, as set forth above, due to heating during trimming operation, the precision is limited.

Therefore, in the shown embodiment, an adjusting resistor is added to the temperature sensitive resistor. The additional voltage adjusting resistor is integrated with the temperature sensitive resistor.

The resistance value of the temperature sensitive resistor is adjusted at a reference temperature, e.g. 25° C. of the adjusting resistor integrated with the temperature sensitive resistor. By this, the fluctuation of $R_{CO}$ shown in the foregoing equation (13) can be absorbed so that the air temperature measuring unit with suppressed fluctuation can be obtained.

Figure 25:
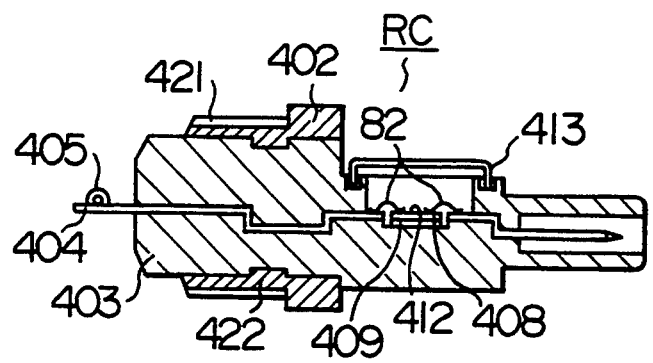
FIG. 25 is a section of an air temperature measuring sensor.
Figure 26:
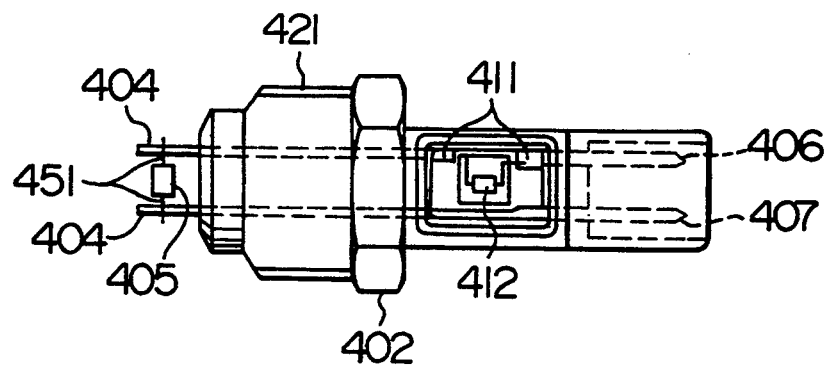
FIG. 26 is an illustration of the air temperature measuring sensor, which is partially shown as through view.

FIG. 25 shows a construction in section of the air temperature measuring resistor RC according to the present invention, and FIG. 26 is a plan view of the construction in FIG. 25 as seen from the above, which is illustrated in with removing the cover.

In FIG. 25, RC denotes the air temperature measuring resistor, and 402 denotes a metallic casing which can be mounted within the intake air pipe 5 of the automotive engine to be exposed into an intake air to be measured by a threaded portion 221. 403 denotes a molding resin for inserting a lead pin 404 connected to the temperature sensitive resistor 403 and terminals 406 and 407 for externally ouputting signals. The lead pin 404 and the temperature sensitive resistor 405 are connected by welding the lead 451. 408 denotes a substrate, on which a film resistor 412 is formed. The substrate 408 is fixed to the molding resin 403 by an adhesive 409. The lead pin 404 and the resistor 412 on the substrate, and the terminal 406 and the resistor 412 on the substrate are electrically connected by wire 411 respectively. On the other hand, the lead pin 404 and the terminal 407 are directly connected. Namely, a resistance between the terminals 406 and 407 is provided by the resistor 412 and the temperature sensitive resistor 405 connected in series. 413 denotes a cover which is fixed to the molding resin 403 by the adhesive.

Figure 27:
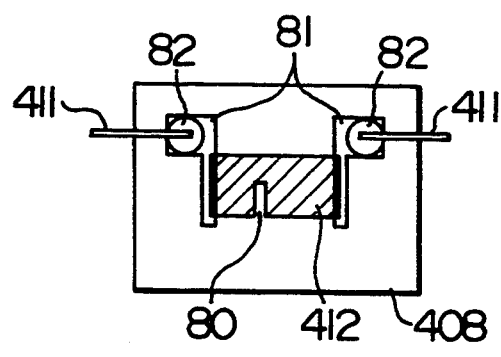
FIG. 27 is an external view of an embodiment of an adjusting resistor.

FIG. 27 shows a further detail of the portion of the substrate 408. On the substrate 408, a film conductors 81 and the film resistor 412 interposed therebetween. Furthermore, pads 82 are soldered on the film conductors 81, The wires 411 are connected to these pads 82.

In the construction set forth above, at a reference temperature, e.g. 25° C., a trimming groove 80 is formed in the resistor 412 by laser trimming for adjusting the resistance value thereof so that the resistance value between the terminals 406 and 407 becomes $R_{CO}$. Accordingly, the air temperature measuring resistor RC having a given resistance value at the reference temperature can be obtained.

Figure 28:
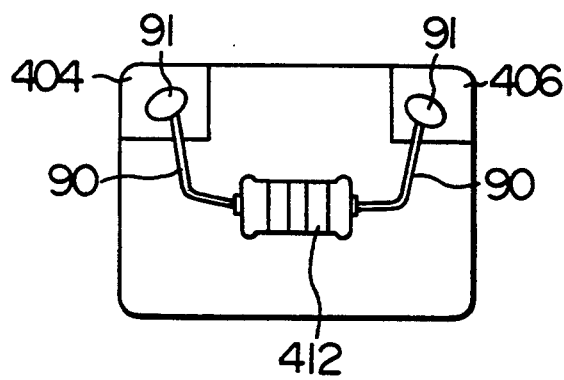
FIG. 28 is an external view of another embodiment of the adjusting resistor.

FIG. 28 shows another embodiment of the resistor 412, in which the substrate 408 is not employed and a lead wire 90 of the fixed resistor 412 corresponding to the resistance of the temperature sensitive resistor 405 is connected to the lead pin 404 and the terminal 406 by soldering 91. Similarly to the embodiment of FIG. 27, by selecting an appropriate fixed resistor 412, the air temperature measuring resistor having a given resistance value at the reference temperature can be obtained.

FIG. 29 shows a connection of an engine control system utilizing the air temperature measuring resistor RC of the present invention. 500 denotes an input unit of a controller for controlling the engine. A constant current I portion 501 provided in,the controller 500 is supplied to the temperature sensitive resistor 405 and the resistor 412 of the air temperature measuring resistor RC. The voltage generated between the terminals 406 and 407 at this time is converted into a digital signal Ta by an A/D converter 502 of the controller 500. The end signal is then transmitted to a not shown arithmetic unit. In the arithmetic unit, the digital signal is processed together with not shown other signals for deriving optimal values for a fuel to be supplied to the engine and for the spark ignition timing tp control the engine operation. By this, the engine can be optimally controlled in relation to the air temperature.

A characteristics fluctuation suppressing effect of the air temperature measuring resistor of the present invention will be discussed in detail with reference to FIG. 30.

In FIG. 30, $R_D$ is a resistance value of the resistor 412, and $R_C$ is a resistance value of the temperature sensitive resistor 405. When the adjusting resistor 412 is not present as in the prior art, the resistance-temperature characteristics falls in a range of (a) and (b). Namely, although a fluctuation of a variation component (temperature coefficient a) relative to the temperature is quite small, the resistance value $R_{CO}$ at the reference temperature (25° C.) fluctuates in a range of $R_{ANODE} \sim R_C MAX$. By adding the resistor 412 and adapting to the range of $R_{ANODE} \sim R_C MAX$ as in the present invention, the characteristics becomes as (c). As a result, the range of fluctuation becomes (a) to (c) to be much smaller.

On the other hand, a high measuring precision is desired at Th instead of the reference temperature, for example, by optimally setting the resistance value $R_D$, the characteristics (d) can be obtained. Namely, high precision can be obtained at the desired temperature range.

Although FIGS. 25~30 show examples, in which the resistor 412 and the temperature sensitive resistor 405 are connected in series, the identical effect can be achieved by parallel connection thereof.

With the shown embodiment, the air temperature measuring resistor with reduced fluctuation in precision of measurement and with capability of obtaining high precision within a desired temperature range, can be obtained. Furthermore, with the shown embodiment, the engine control system for optimally controlling the fuel supply and ignition timing relative to the intake air temperature can be provided.

It should be appreciated that the air flow measuring system according to the present invention is applicable not only to the heating resistor type (hot wire type) air flow measuring system discussed in detail but also to a type where air flow rate is arithmetically derived on the basis of an intake vacuum and an engine speed, a movable vane type (flap type) or Karman's vortex type and so forth. In the present invention, the obtained air flow rate indicative signal and the air temperature indicative signal can be transmitted as a single signal by superimposing the signals, in any type of the air flow measuring system.

The present invention should not be limited to the specific embodiments discussed in detail. It is obvious to one skilled in the art to effect various improvement and modification on the basis of the disclosure given hereabove.

What is claimed is:

1. An air flow measuring system for controlling an automobile engine, comprising:
   an air flow rate measurement device providing an output air flow signal indicative of a measured air flow rate, said air flow signal comprising sequential pulses having a frequency indicative of said measured air flow rate;
   an air temperature detector circuit providing an output temperature signal indicative of a measured air temperature, said temperature signal comprising an analog voltage signal having a magnitude indicative of said air temperature; and
   mixing means for directly superimposing said air flow signal onto said analog voltage signal to produce an output signal communicating information about each of the air flow rate and the air temperature, said output signal being output to a single signal transmission path.

2. An air flow measuring system as set forth in claim 1, wherein said air flow rate measurement device, said air temperature detector circuit and said mixing means are formed on a circuit board.

3. An air flow measuring system as set forth in claim 1, wherein said air flow measurement device comprises a heating resistor arranged in an air flow to be measured, a control circuit for controlling current flowing through said heating resistor to maintain a temperature of said heating at a constant value, and means for converting a voltage corresponding to said current into said sequential pulse signal having said frequency.

4. An air flow measuring system as set forth in claim 3, which further comprises a temperature sensitive resistor arranged in the air flow to be measured, and a current circuit for flowing a given constant current to said temperature sensitive resistor, said control circuit including a temperature sensitive resistor arranged within the air flow to be measured for temperature compensation for said current, and said means for outputting said air temperature indicative signal includes an arithmetic circuit for generating said air temperature indicative signal by dviding a voltage in said temperature sensitive resistor by a voltage corresponding to the current flowing through said temperature sensitive resistor.

5. An air flow measuring system as set forth in claim 3, wherein said mixing means includes a differentiation circuit having a given time constant for differentiating said sequential pulses of said air flow signal from said signal converting means, the signal differentiated by said differentiation circuit being superimposed with said temperature signal to form said output signal.

6. An air flow measuring system as set forth in claim 4, wherein said temperature sensitive resistor includes a sensing resistor formed of a temperature sensitive material and an adjustable resistor to be connected to said sensing resistor and adjustable of the resistance value thereof.

7. An air flow measuring system as set forth in claim 6, wherein said adjustable resistor is a fixed resistor.

8. An air flow measuring system as set forth in claim 1, wherein said air temperature detector circuit comprises a temperature sensitive resistor arranged in an air flow to be measured, a current circuit for flowing a constant current to said temperature sensitive resistor and a measuring circuit for outputting a voltage signal corresponding to variation of a resistance value of said temperature sensitive resistor as said analog voltage signal.

9. An air flow measuring system as set forth in claim 1, wherein said current circuit and said measuring circuit for outputting said analog voltage signal are formed on a common substrate.

10. An air flow measuring system as set forth in claim 9, wherein said current circuit and said measuring circuit comprise a single micro-module.

11. An air flow measuring system as set forth in claim 1, which further comprises a temperature sensitive resistor arranged in the air flow to be measured, and a current circuit for flowing a given constant current to said temperature sensitive resistor, said control circuit including a temperature sensitive resistor arranged within the air flow to be measured for temperature compensation for said current, and said means for outputting said air temperature indicative signal includes judgement means for detecting said air flow rate indicative signal becoming equal to a predetermined value, sampling means for detecting a voltage corresponding to a resistance value of said temperature sensitive resistor when said air flow rate indicative signal equal to said predetermined value is detected.

12. An air flow measuring system as set forth in claim 11, wherein said sampling means further comprises a voltage holding circuit which includes switching means for closing in response to said air flow rate indicative signal equal to said predetermined value, and a capacitor to be charged by said voltage to the resistance value of said temperature sensitive resistor when said switching means is closed.

13. An air flow measuring system as set forth in claim 11, which comprises a common substrate, on which said judgement means and said sampling means are formed, and a container to receiver overall construction.

14. An air flow measuring system as set forth in claim 12, wherein said predetermined value is selected in a range of 20~50 kg/h as an air flow rate.

15. An air flow measuring system as set forth in claim 1, which further comprises a first temperature sensitive register arranged in an air flow to be measured, and a control circuit providing a constant current flowing through said first temperature sensitive register, said control circuit including a second temperature sensitive resistor arranged in the air flow to be measured, for temperature compensation for the constant current.

16. An air flow measuring system as set forth in claim 15, wherein said temperature sensitive resistor comprises a sensing resistor formed of a temperature sensitive material, and an adjustable resistor having adjustable resistance value connected to said sensing resistor.

17. An air flow measuring system as set forth in claim 16, wherein said adjustable resistor comprises a film resistor.

18. An air flow measuring system as set forth in claim 16, which further comprises a holder for supporting said adjustable resistor and said sensing resistor and having a terminal for electrically connecting said temperature sensitive resistor to an external component.

19. A signal input device for receiving an output signal from an air flow measuring system, of the type comprising:
an air flow rate measurement device providing an output air flow signal indicative of a measured air flow rate, said air flow signal comprising sequential pulses having a frequency indicative of said measured air flow rate;
an air temperature detector circuit providing an output temperature signal indicative of a measured air temperature, said temperature signal comprising an analog voltage signal having a magnitude indicative of said air temperature; and
mixing means for directly superimposing said air flow signal onto said analog voltage signal to produce an output signal communicating information about each of the air flow rate and the air temperature, said output signal being output to a single signal transmission path;
wherein said air flow measurement device comprises a heating resistor arranged in an air flow to be measured, a control circuit for controlling current flowing through said heating resistor to maintain a temperature of said heating at a constant value, and means for converting a voltage corresponding to said current into said sequential pulse signal having said frequency; and
wherein said mixing means includes a differentiation circuit having a given time constant for differentiating said sequential pulses of said air flow signal from said signal converting means, the signal differentiated by said differentiation circuit being superimposed with said temperature signal to form said output signal;
said signal input device comprising:
filter means for extracting said air temperature indicative signal from said output signal received from said signal transmission path; and
means for obtaining said air flow signal by subtracting said temperature signal extracted by said filter means from said output signal received from said signal transmission path.

20. A signal input device as set forth in claim 19, wherein a time constant of said filter means is equal to the time constant of said differentiation circuit.

21. A method for measuring an air flow rate comprising the steps of:
measuring an air flow rate and generating an air flow signal indicative of said air flow rate, said air flow signal comprising sequential pulses having a frequency indicative of said air flow rate;
measuring temperature of air comprising said air flow rate and generating a temperature signal comprising an analog voltage signal having a magnitude indicative of said measured temperature; and
superimposing said air flow signal onto said analog voltage signal to produce an output signal which communicates information about each of the air flow rate and the air temperature, said output signal being provided to a single transmission line.

22. Method according to claim 21, wherein said superimposing step comprises:
differentiating said sequential pulses of said air flow signal to generate a series of voltage spikes;
combining said voltage spikes with said analog voltage signal to generate an analog signal having a waveform comprising said analog voltage signal, with said voltage spikes superimposed thereon.

23. Method according to claim 22, wherein said combining step comprises adding a magnitude of each of said voltage pulses to a magnitude of said analog voltage signal.

* * * * *